United States Patent
Takano

[19]

[11] Patent Number: 5,940,831
[45] Date of Patent: Aug. 17, 1999

[54] HYPERMEDIA SYSTEM AND METHOD OF MANAGING DIRECTORIES AND DIRECTORY DATA ORIGINATING FROM A NODE LINK STRUCTURE IN A DIRECTORY SERVER

[75] Inventor: Hajime Takano, Tokyo, Japan

[73] Assignee: NEC Corporation, Tokyo, Japan

[21] Appl. No.: 08/916,359

[22] Filed: Aug. 22, 1997

[30] Foreign Application Priority Data

Aug. 28, 1996 [JP] Japan ................................ 8-226293

[51] Int. Cl.[6] ........................................................ G06F 17/30
[52] U.S. Cl. ........................ 707/10; 707/501; 707/513; 395/200.47; 395/200.48; 345/356
[58] Field of Search ........................... 707/1–6, 10, 104, 707/501, 513; 345/329, 346, 356, 357; 395/200.3, 200.47, 200.48, 200.49, 200.33; 705/26

[56] References Cited

U.S. PATENT DOCUMENTS 5,649,186  7/1997  Ferguson ................................ 707/10
5,761,418  6/1998  Francis et al. ..................... 395/200.31
5,768,578  6/1998  Kirk et al. ............................... 707/100

OTHER PUBLICATIONS

Koster, "ALIWEB—Archie–like Indexing in the WEB", Computer Networks and ISDN System S 27, (1994) pp. 175–182.

*Primary Examiner*—Thomas G. Black
*Assistant Examiner*—Hosain T. Alam
*Attorney, Agent, or Firm*—Foley & Lardner

[57] ABSTRACT

A hypermedia system operating in a network environment comprises one server or more for storing node data and its link data; a client including the data display means, which shows node data obtained from the server, and the directory information display means, which shows the directory information obtained from the directory server; and a directory server including directory information storage means, which stores directory information indicating the characteristics of node data and link data stored in each server, a secondary information storage means, which stores directory secondary information which is obtained by editing the directory information, and a retrieval means to select appropriate data from the directory information storage means and the secondary information storage means.

2 Claims, 11 Drawing Sheets

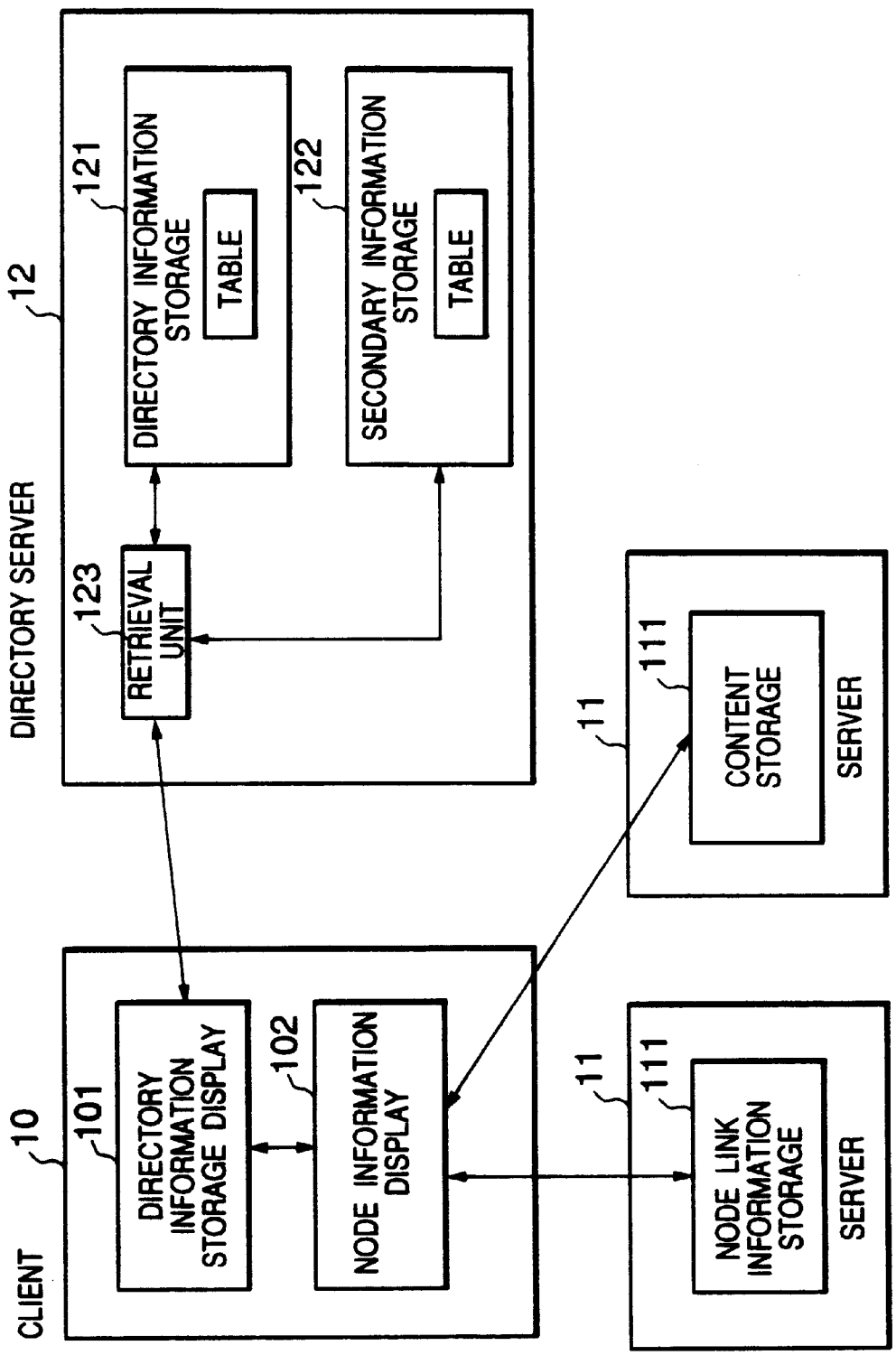

FIG.2

| NODE IDENTIFIER | HOST | FILE NAME | DOCUMENT TITLE | |
|---|---|---|---|---|
| node001 | host1.AAA.co.jp | DIR1/file1 | title-A | 21 |
| node002 | host2.AAA.co.jp | DIR1/file2 | title-B | 22 |
| node003 | host1.BBB.co.jp | DIR5/file3 | title-C | 23 |
| node004 | host3.BBB.co.jp | DIR4/file1 | title-D | 24 |
| node005 | host30.AAA.co.jp | DIR3/subdir3/file2 | title-E | 25 |

(table 20)

FIG.3

| CATEGORY ID | CATEGORY | NODE LIST | |
|---|---|---|---|
| class101 | SPORT | node001,node003,node007 | 31 |
| class102 | ENTERTAINMENT | node002,node004,node006 | 32 |
| class103 | SOCIETY | node011,node023,node027 | 33 |
| class104 | HISTORY | node022,node034,node036 | 34 |
| class105 | LITERATURE | node023,node025 | 35 |

(table 30)

| CATEGORY ID | CATEGORY | NODE LIST | RELATED CATEGORY | |
|---|---|---|---|---|
| class101 | SPORT | node001,node003,node007 | ENTERTAINMENT  SOCIETY | 51 |
| class102 | ENTERTAINMENT | node002,node004,node006 | SPORT  LITERATURE | 52 |
| class103 | SOCIETY | node011,node023,node027 | HISTORY  ENTERTAINMENT | 53 |
| class104 | HISTORY | node022,node034,node036 | LITERATURE  SOCIETY | 54 |
| class105 | LITERATURE | node023,node025 | SPORT | 55 |

FIG.8

| CATEGORY ID | CATEGORY | NODE LIST |
|---|---|---|
| class001 | AAA.co.jp | node001,node002,node003,node004,node006,node007 |
| class002 | host1.AAA.co.jp | node001,node003,node007 |
| class003 | host2.AAA.co.jp | node002,node004,node006 |
| class004 | BBB.co.jp | node020,node030,node031,node005 |
| class005 | host3.BBB.co.jp | node023,node027 |

HYPERMEDIA SYSTEM AND METHOD OF MANAGING DIRECTORIES AND DIRECTORY DATA ORIGINATING FROM A NODE LINK STRUCTURE IN A DIRECTORY SERVER

BACKGROUND OF THE INVENTION

The present invention relates to a hypermedia system in a network environment, and more particularly to a hypermedia system intensively managing secondary information which is based upon directory information and directory data originating from a node link structure in a directory server in a network.

Recently, hypermedia systems have been drawing much attention as a technology for managing computer information.

A hypermedia system is used to process multimedia data including image data, voice data, and text data based upon a hypertext structure that permits retrieval in an interactive manner without using file names, by directly relating the contents of related data files. The data files hereafter will be called nodes.

The World Wide Web (hereinafter called WWW) is an example of widely used hypermedia systems in a network environment. FIG. 13 shows this type of conventional hypermedia system structure.

As shown in FIG. 13, WWW comprises client 131 and WWW servers 132a, 132b, and 132c. Each of WWW servers 132a, 132b, 132c stores several content files as nodes in hypertext. The location of these contents are uniquely determined by a node identifier called URL (Uniform Resource Locator). The relation between nodes is described by tracking the URL described in each content file. Solid arrows in FIG. 13 show data flows, while dotted arrows indicate relations between nodes.

Client 131 accesses WWW server 132a in a network according to the URL designated by a user, obtains a content file 1321 of a node identified by the node identifier, and outputs its content. For example FIG. 13 indicates, a case where a node identifier is designated in the content file 1321 of server 132a. Client 131 obtains a content file 1321 from server 132a and outputs its content (such as text) in a display screen. Anchor area 1311 is defined in the content file 1321 which is displayed, and when the area makes a selection, a node identifier of the content file 1322 linked to content file 1321, is determined. Client 131 then accesses the server 132c in a network 130 to obtain and output the content of 1322.

Further, Japanese Patent Application No. Hei. 8-023319 ("Hypertext System") discloses a technology to make the process of navigation more effective by recognizing the content of the content files and the status of their relations in such a way that directory servers can manage node data such as indexes which indicate the content of the content files, the node identifier of the content files, and the link data in a network. This technology allows for the concentration of content files scattered in a network to be centralized in one location.

Another conventional system is disclosed in Martijn Koster's paper "ALIWEB" in Computer Networks and ISDN Systems, pp. 175–182.

According to the above-mentioned conventional hypermedia system however, it is impossible to see the link data of the nodes or its contents until the client reads the content of the nodes on the WWW.

Further, even in an approach demonstrated in Japanese Patent Application No. Hei.8-023319, due to a large amount of data on the WWW, results obtained from inquiries based on the content of content files and node link relations for directory service, proved the resulting information to be too vast. Unless the operation of retrieval and navigation is repeatedly performed, the target information is unable to be obtained.

In order to effectively navigate a large amount of node information existing in a network, secondary information about the macro structure is needed. Having this kind of knowledge enables one to browse node content as well as the hypermedia structure comprising node link data. However, the previously mentioned conventional technology permits navigation only based on primary information such as link structure or keyword indexes relating to each node.

Therefore, a first objective of this invention is to ensure more efficient navigation for users by using additional secondary information in a hypermedia system operating in a network environment.

In addition, when storing the secondary information used for navigation in a directory server, the secondary information must be updated as node information is generated and updated. This makes the workload heavy for a server manager.

Accordingly, a second objective of this invention is to provide a means to more effectively update the secondary information in a directory server.

SUMMARY OF THE INVENTION

According to an aspect of the invention, there is provided a hypermedia system operating in a network environment which comprises: one or more servers storing the node data and its link data; a client including the data display means which displays the node data obtained from the server, and the directory information display means to display the directory information obtained from the directory server, and a directory server including directory information storage means for storing directory information indicating the characteristics of the node and link data stored in each server, the secondary information storage means storing the directory secondary information which is obtained by editing the directory information, and retrieval means to select appropriate data from the directory information storage means and the secondary information storage means.

Further, the hypermedia system comprises the secondary information storage means to store directory secondary information including predetermined, designated category items, and a group of node data belonging to the category items.

Furthermore, the hypermedia system comprises the secondary information storage means to store predetermined, designated category items, the node data belonging to the said category item and the category items related to the said category.

In addition, the hypermedia system comprises the said secondary information storage means to allow the description of a child category instead of a node data when there is a parent-child relationship in a predetermined, designated category, and the node data belonging to the child category in the category belongs to the parent category.

Further, the hypermedia system comprises the secondary information generator means to generate the directory secondary information based upon the directory information According to another aspect of the invention, there is provided a method which comprises: a first step, in which a domain name, a host name and a directory name using node data including the combination of a domain name as an address in a network, and a directory name, are extracted; a second step in which to generate a cluster not existing according to the domain name, host name, and directory name extracted in the first step; and a third step in which to register a node by selecting the appropriate cluster generated in the second step.

In addition, the method comprises a fourth step to examine the existence of a link between nodes in the cluster data generated before the node is registered; a fifth step to count the number of links existing between the clusters, and a sixth step to compute the intensity of inter-cluster relations, based upon the results of the computation in the fourth and fifth steps.

BRIEF DESCRIPTION OF THE DRAWINGS

Other features and advantages will become apparent from the following description, when taken in conjunction with the accompanying drawings in which:

FIG. 1 shows a first embodiment of the present invention;

FIG. 2 shows a table indicating the information data structure stored in the directory information storage of the embodiment of the present invention;

FIG. 3 shows a table indicating the information data structure stored in the secondary information storage of the embodiment;

FIG. 8 shows a table for the data structure of the information stored in the secondary information storage of the embodiment;

DETAILED DESCRIPTION OF THE PREFERRED EMBODIMENTS

Figures 4, 5:
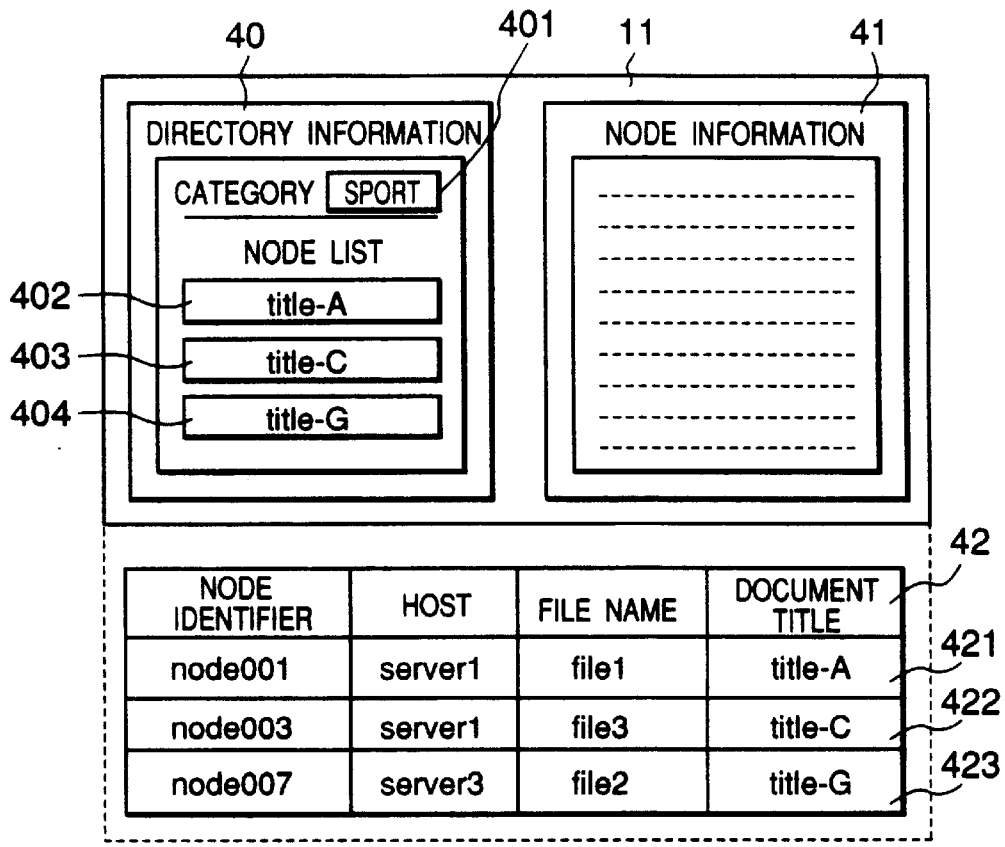
FIG. 4 shows an example of the image in the display screen of the client in the embodiment according to the data structure shown in FIGS. 2 and 3.
FIG. 5 shows a table indicating the information data structure stored in the secondary information storage of the embodiment of the present invention.

Description will next be made on preferred embodiments of the invention in detail with reference to the drawings.

FIG. 1 shows a first embodiment of a hypermedia system of the invention.

As shown in the FIG. 1, the embodiment comprises client 10, server 11 holding content files, and directory server 12 the centralized manager of information related to the content files. These are connected in a network. At the present, FIG. 1 only describes the characteristic structures of the embodiment, omitting other structures.

Client 10 comprises the directory information retrieval display 101 and the node information display 102: the former demands the information retrieval from the directory server and displays the information obtained from directory server 12; while the latter outputs the content of the content files obtained from server 11. This can be realized for example, by a display apparatus and controlling methods implemented by a program-controlled CPU.

The server 11, which is the same as the server of the conventional hypermedia, comprises the node link information storage 111, managing the node identifier of the content files and storing the content files. The node link information storage 111 can be realized for example, by a memory apparatus such as program-controlled CPU and a magnetic disk apparatus.

The directory server 12 comprises the directory storage 121, the secondary information storage 122 and the retrieval unit 123. The directory server 12 stores, according to each node managed in server 11, the node identifiers and the information related to the content of the content files as the node (hereafter the information will be called node data). The secondary information storage 122 stores the directory secondary information extracted from the node data. The retrieval 123 retrieves the information of the directory information storage 121 and the secondary information storage 122 according to the request from the client. The directory information storage 121 and the secondary information storage 122 can be realized for example, by a memory apparatus such as a magnetic disk apparatus, and the retrieval 122 by an apparatus such as program-controlled CPU.

FIG. 2 shows table 20 to indicate an example of the data structure of the information stored in the directory information storage 121.

Table 20, as shown in FIG. 2, comprises columns which include at least node identifiers, host names, and file names having their contents and the titles of those contents.

FIG. 3 shows table 30 to indicate an example of the data structure of the information stored in the secondary information storage 122.

Table 30, as shown in FIG. 3, comprises columns which include at least the category ID, category name and a list of the node identifiers corresponding to each row. When table 30 is stored in the secondary information storage 122, it becomes possible to search the target content files by accessing directory server 12 and referring to table 30 of secondary information storage 122 without server 11 having to store the nodes. In accordance with table 20 and 30, the process of referring to nodes belonging to a category designated by a user and displaying the content of the content files in the node selected, will be now described.

First, we assume that a user selects a category name, "sports", for reference. The directory information retrieval display 101 of client 10 demands the directory information in the category name "sports" from retrieval 123 in directory server 12.

The retrieval 123 refers to table 30 stored in directory information storage 121, selects a node identifier in the row 31 having the category name "sports" as category data in the category column, and then returns this to client 10. At this time, the retrieval 123 selects a host name, file name, and title name respectively according to the node identifiers "node001", "node003", and "node007", from table 20 and simultaneously returns them to client 10.

The directory information retrieval display 101 in client 10 temporarily stores the directory information obtained from the retrieval 123, and describes part of them as a label. FIG. 4 shows an example of temporary storage of directory information and a display screen of client 10. As shown in the Figure, display screen 11 comprises a directory information display area 40 and a node information display area 41. The directory 14 information display area 40 comprises the category name display column 401 and the node list column to indicate a title of each node from 402 through 404. The entered word "sports" is displayed in the category name bar 401 and a title that is retrieved for each node is displayed in the node list display area 402 to 404. The temporary memory 42 stores the host name, file name and title name for each of the node identifiers, "node001", "node003", and "node007", in each of the rows from 421 to 423, according to the directory information notified from the retrieval 123.

In this situation, when label 403 is selected by a user, the directory information retrieval display 10 notifies the node information display 102 that "node003" was selected according to temporary memory 42. The node information display 102 requests node link data storage 111 in server 11 whose host name is "server 1" to transmit the content file as a node having node identifier "node003."

When receiving a transmission request from the node information display 102, the node link information storage 111 in server 11 retrieves the content files having a designated node identifier,"node003", and then transmits them to the client.

The node information display 102 in client 10 accepts the content files sent from the server 11 and indicates them in the display screen 11. As shown in FIG. 4, the obtained content files are displayed in the node information display area 31 in display screen 11 of client 10. According to the embodiment of the invention, both directory information display area 40 and the node information display area 41 are shown in a single display screen as shown in FIG. 4. However, it is possible to display them in a separate display screen if desired. FIG. 5 shows a table indicating the data structure of the information stored in the secondary information storage 123.

As shown in FIG. 5, table 50 comprises several columns which contain at least category ID, category name, a list of node identifiers belonging to the said category and list of other categories related to the said category. When table 50 is kept stored in the secondary information storage 122, retrieving related data becomes easier and server 11 does not have to store nodes. By accessing server 12 and referring to table 50, one not only can track the target content files, but also the category relation and connected data that will allow for an easier search.

The operation of the embodiment of this invention is described as follows according to table 20 and table 30. In addition to the aforementioned operation of the embodiment, the operation to select a category different from the category list relating to the user-designated category can now be performed.

First, we assume that a user selects the category name, "sports", for reference. The directory information retrieval display 101 in client 10 demands the directory information in the category name "sports" from retrieval 123 in directory server 12.

Retrieval 123 refers to table 50 stored in the directory information storage 121, selects both node identifiers in row 51 having the category name "sports" as category data in the category column and related category, and then returns them to client 10. At this time, the retrieval 123 selects the host name, file name and title name respectively according to the node identifiers, "node001", "node003", and "node007" which are selected from table 10 and simultaneously returns them to client 10.

Figure 6:
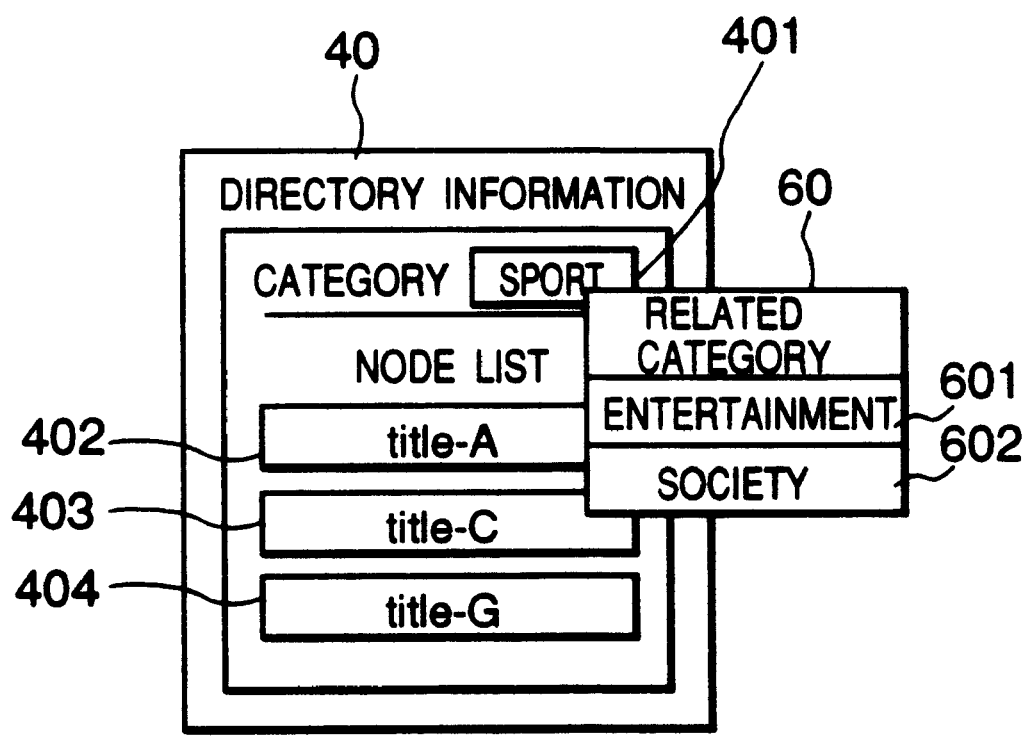
FIG. 6 shows an example of the image in the display screen of client in the embodiment according to the data structure shown in FIGS. 2 and 5.

Directory information retrieval display 101 in client 10 temporarily stores the directory information obtained from retrieval 123, and displays part of it as a label. FIG. 6 shows an example of the display screen of client 10. As shown, the directory information display area 40 as a display screen, comprises a column 401 to indicate category name and a node list display column, in which the title of each node is 402 through 404. Retrieval key display area 401 displays the category "sports" that is entered. Labels from 402 to 404 display the title for each node that is retrieved.

Furthermore, by indicating the category name display column 401, the related category display area 60 appears. The related category display area 60 displays the related category names as labels 601 through 602. If a user selects a label 601 at this stage, the directory information retrieval display 101 notifies the selection of "entertainment" as a category name, and demands the directory information for the category name, "entertainment," from retrieval 123 in directory server 12.

Retrieval 123 refers to table 50 stored in the directory information storage 121, and returns to client 10 the node identifiers "node011," "node023," "node027," in row 52 having the category name "entertainment" in the category data within the category column, and the related categories, "sports," and "literature."

Based upon the directory information extracted from retrieval 123, directory information retrieval display 101 updates and displays the contents of the directory information display area 40.

Figure 7:
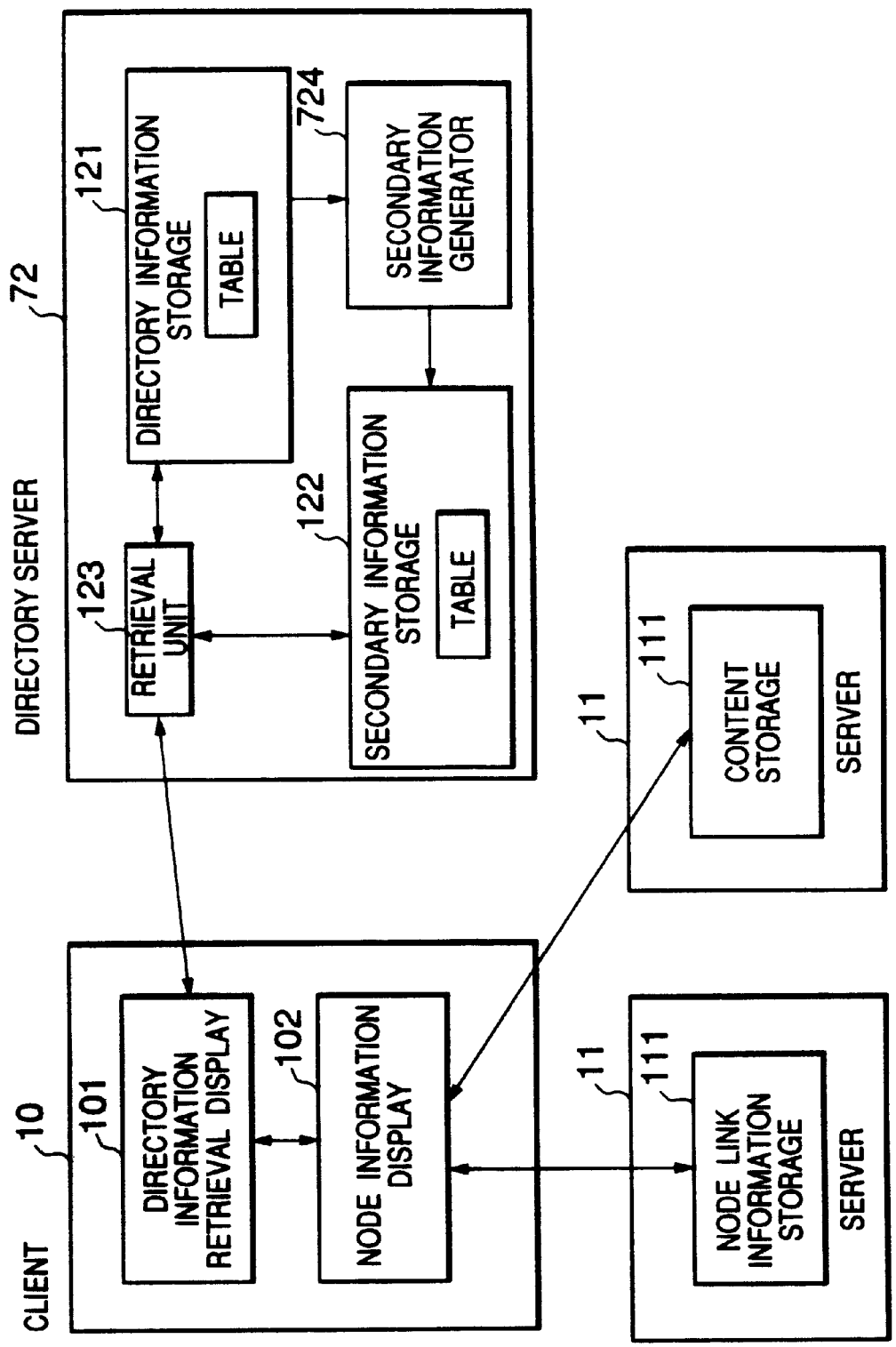
FIG. 7 shows the hypermedia system structure based on the second embodiment of the present invention.

FIG. 7 shows a second embodiment of this invention, hypermedia system.

As shown in FIG. 7, the embodiment comprises client 10, server 11 holding content files, and directory server 72 centrally managing the content file-related information in the same way as in the first embodiment.

In the embodiment of the invention, directory server 72 comprises the directory information storage 121, secondary information storage 122, retrieval 123, and secondary information generator 724. Directory information storage 121 stores the node link information and the information relating the content of content files as nodes and node identifiers for each node managed in server 11 (hereafter the information will be called node data). The secondary information storage 122 stores directory secondary information extracted from the node data. Retrieval 123 retrieves the information of directory information storage 121 and secondary information storage 122, upon the request from a client. The secondary information generator 724 generates the secondary information to be stored in the secondary information storage 122 based upon the content of directory information storage 121. Directory information storage 121 and the secondary information storage 122 can be realized for example, by a memory apparatus such as a magnetic disk apparatus, while retrieval 123 and secondary information generator 724 can be realized by an apparatus such as a program-controlled CPU.

FIG. 8 shows table 80 indicating an example of data structure stored in the secondary information storage 123 of the embodiment.

As shown in FIG. 8, table 80 comprises columns which contain at least a category and a list of node identifiers belonging to the said category. Attention should be focused on the fact that nodes belonging to class 112 and class 003 are included in class 001. Therefore the node list for class 001 includes the node list for class 002 and class 003.

Figure 9:
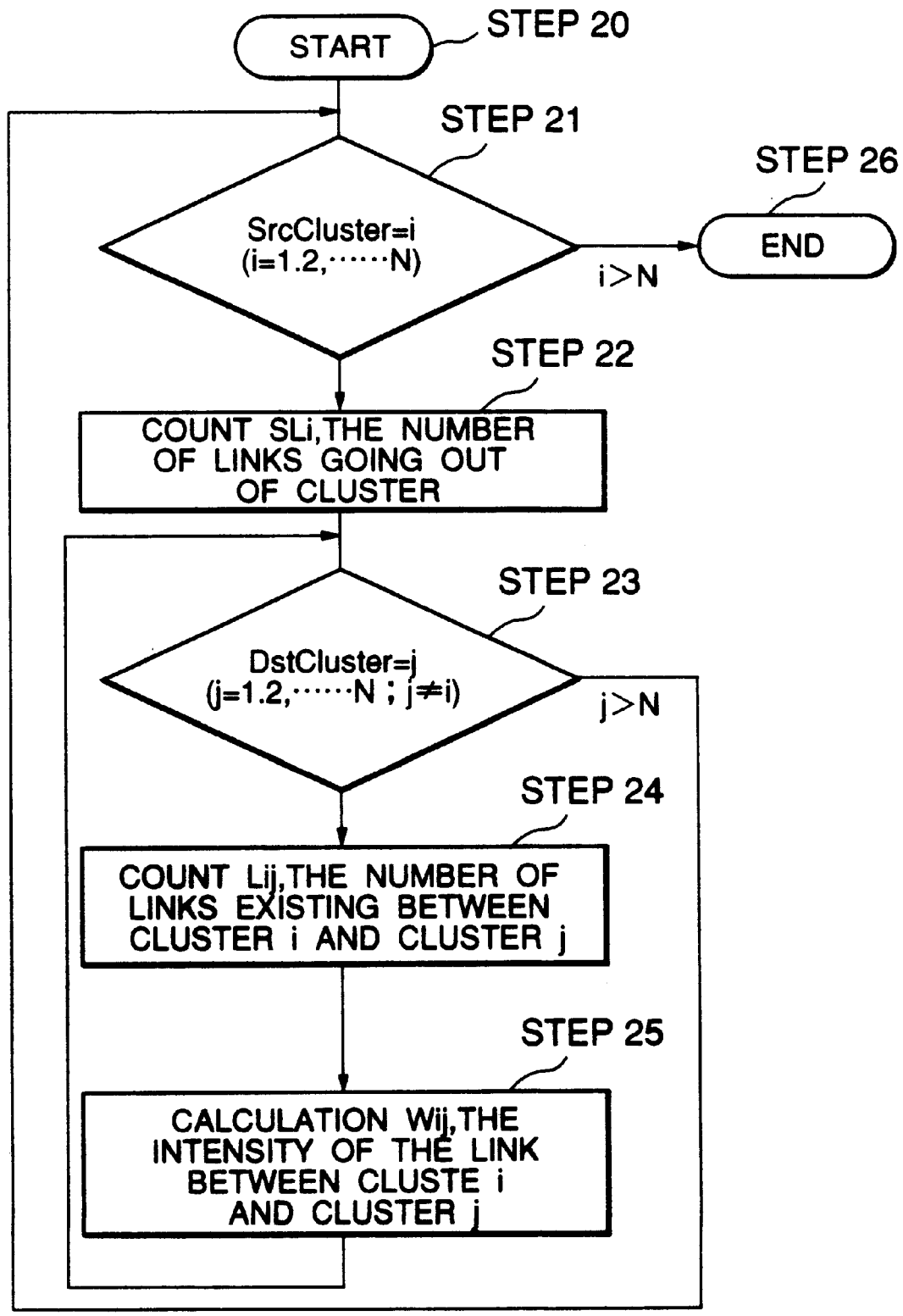
FIG. 9 shows a flowchart to indicate the process in the secondary information generator of the embodiment.

Next, the process of this embodiment is now described with reference to table 20 and table 80. We assume table 80 is empty at an initial stage. Referring to FIG. 9, secondary information generator 724 in step 11 reads out one record in order from table 20. The scope of the record to be read out can be restricted by any conditions the user adds.

First, let's assume record 21 in table 20 is read, then node identifier, "node001," domain name, "AAA.co.jp" from the host name and file name, host name, "host1" and directory name, "DIR1" 21 are obtained in step 13.

Next, set up a category name as a domain name, "AAA.cp,jp" in step 14 and examine whether or not this category exists in table 80 in step 15. Since table 80 does not have any data at this moment, a record of category name, "AAA.co.jp" will be generated at step 16.

In addition, add a node identifier, "node001" to a node list of a category name, "AAA.co.jp" in step 17.

Now return to step 14 and repeat the above-mentioned process from step 14 to step 17 with a category name as a host name, "host1."

Records 81–82 in table 80 are generated by the afore-mentioned process.

Apply the said process from step 11 to step 17 to all the records selected from table 20. If no records are found for processing, the process ends.

Figure 10:
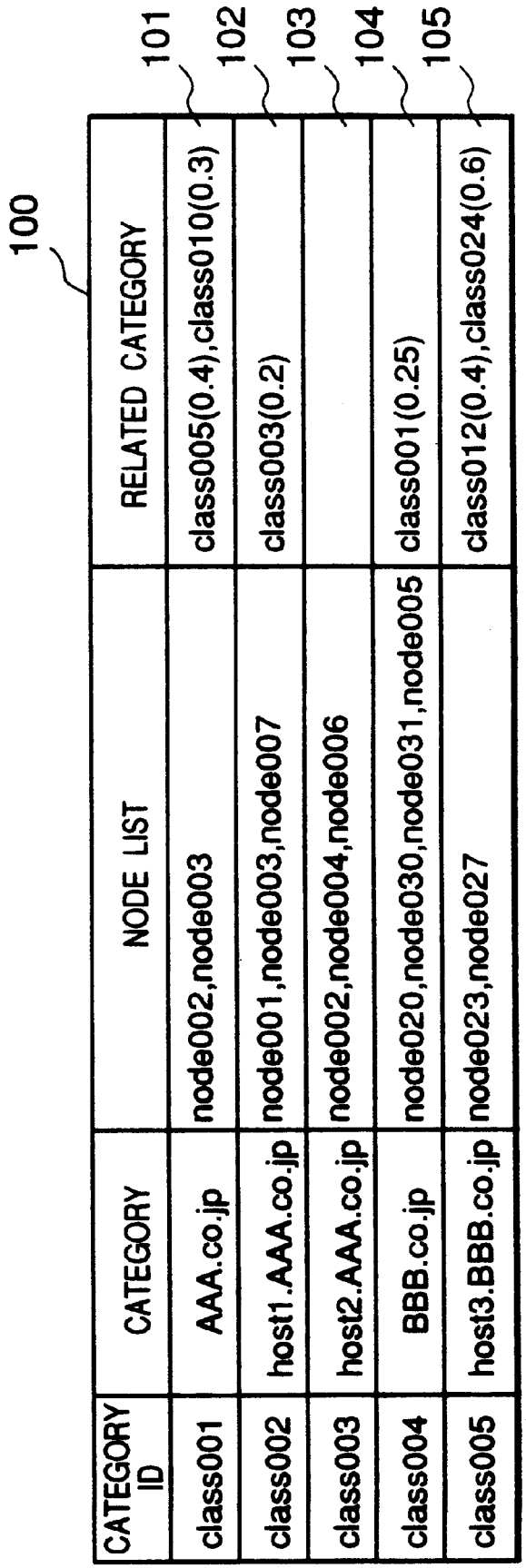
FIG. 10 shows a table to indicate the data structure of the information stored in the secondary information storage of the embodiment.

FIG. 10 shows table 100 giving an example of the data structure of information stored in the secondary information storage 122 in the embodiment.

As shown in FIG. 10, table 100 comprises an additional column for a related category name corresponding to each row as a complement respective to the content of table 80.

Figure 11:
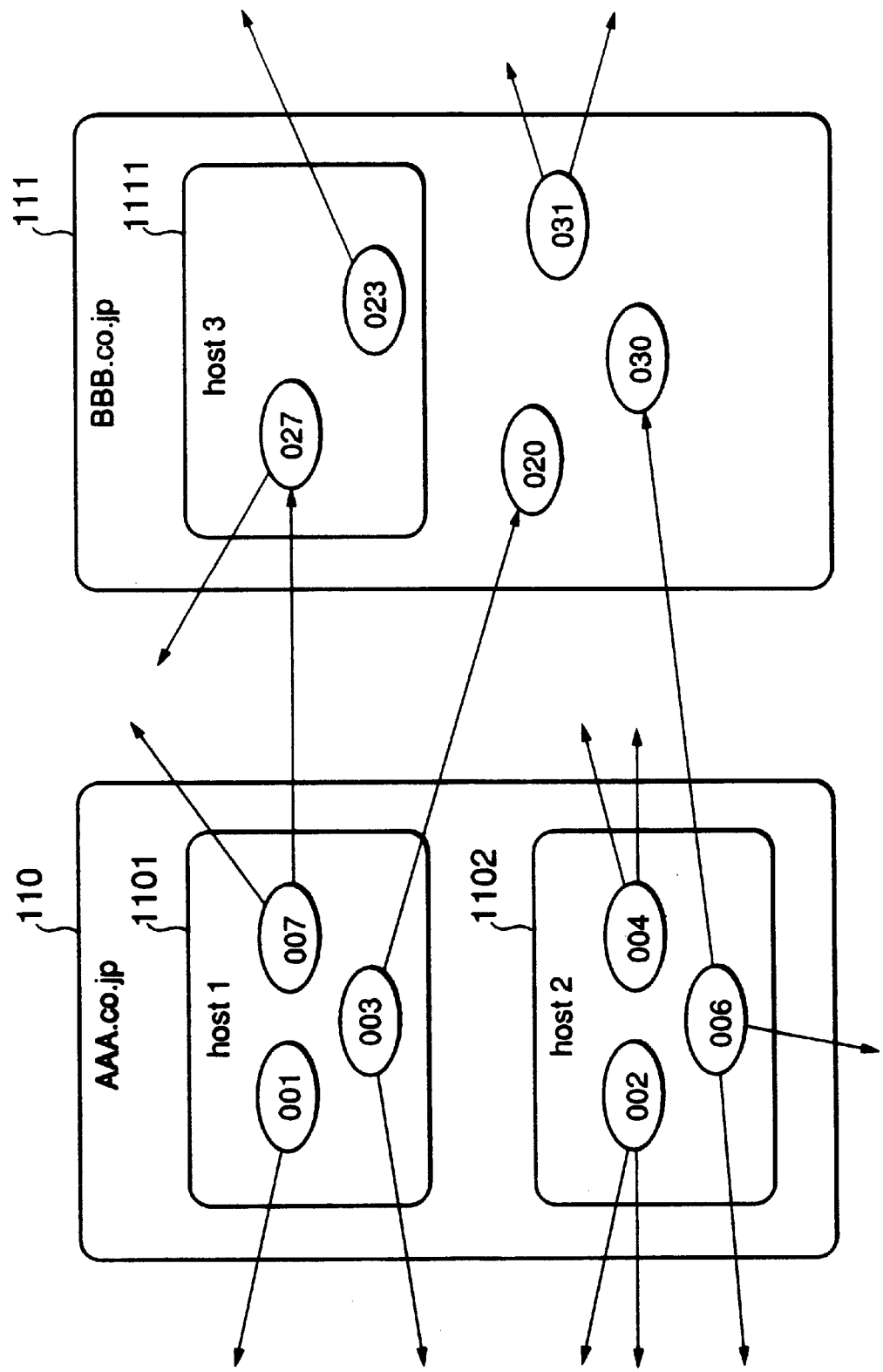
FIG. 11 shows a node structure relation of the embodiment.
Figure 12:
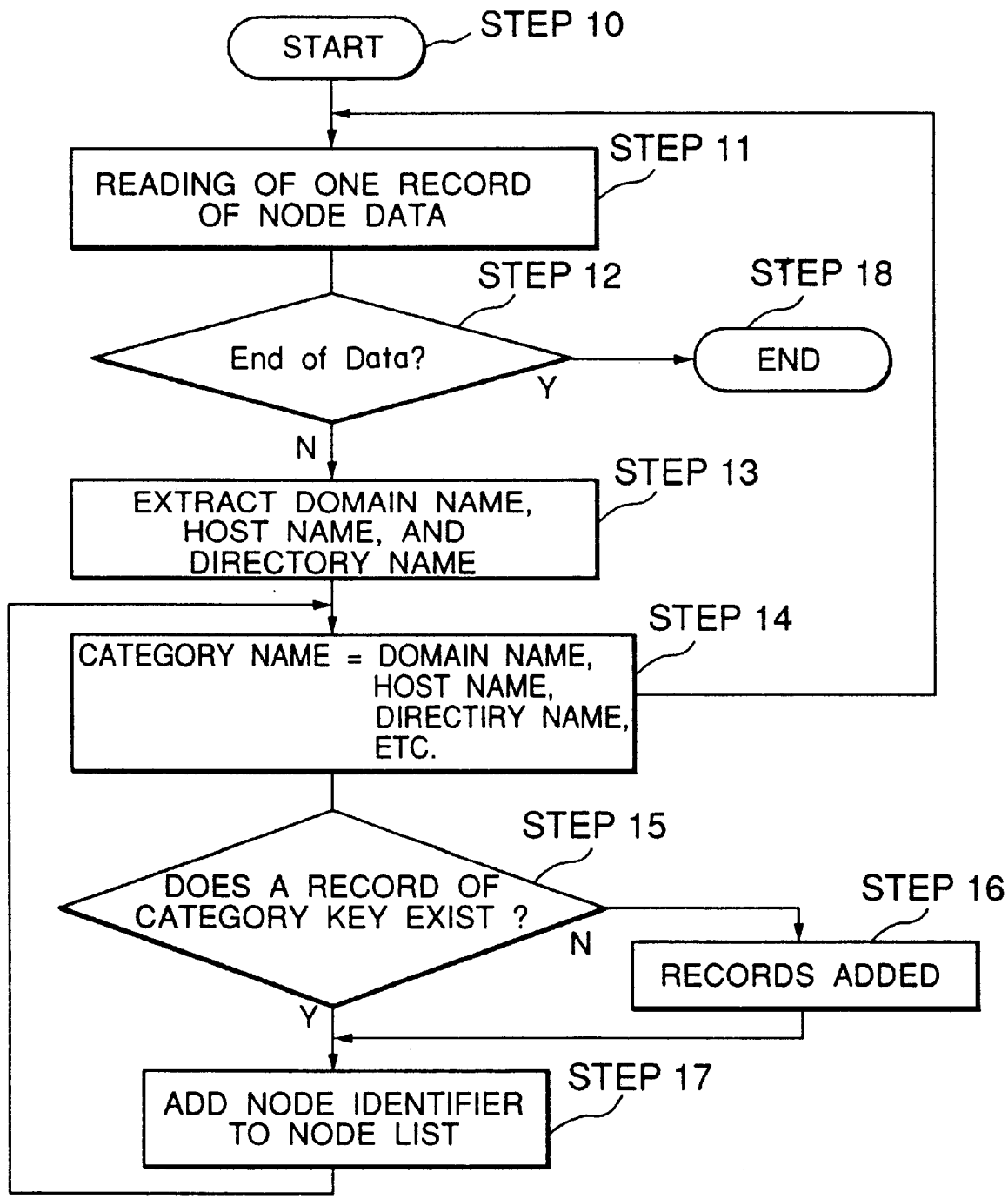
FIG. 12 shows a flowchart to indicate the process in the secondary information generator of the embodiment.
Figure 13:
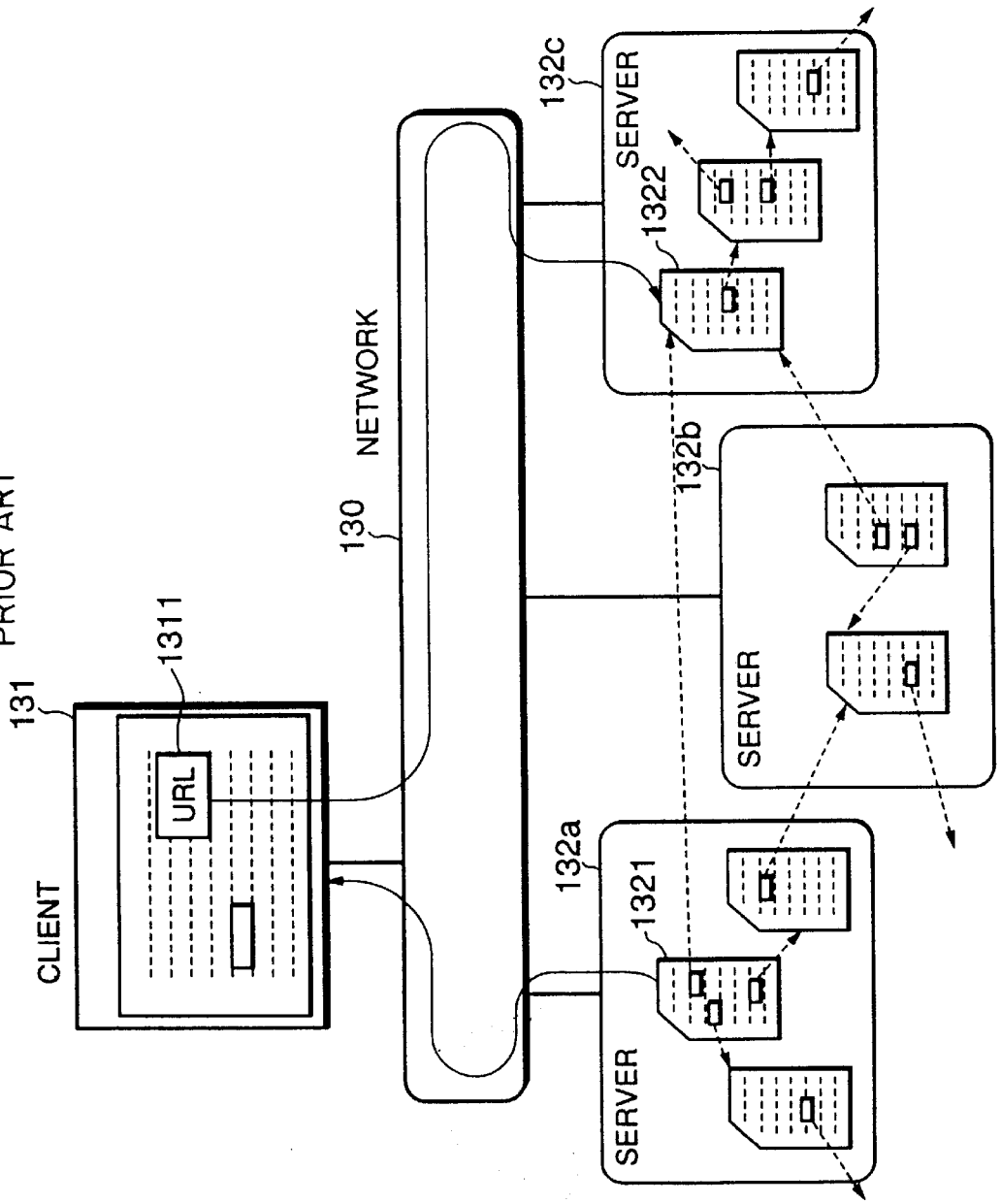
FIG. 13 shows an example of the conventional technology.

FIG. 11 shows the relation of nodes and their links, and the clusters each node belongs to according to the content of table 100. As shown in FIG. 11, a cluster 110 indicates category, "AAA.cp.jp" and cluster 111 indicates a category, "BBB.co.jp." Cluster 110 includes a cluster 1101 to indicate a category, "host1.AAA.co.jp" and a clusterll02 to indicate a category, "host2.AAA.co.jp," and the nodes belonging to each category. In the same way, cluster 111 includes a cluster 1111 to indicate a category, "host3.BBB.co.jp," and its nodes. The link from each node is depicted as an arrow in FIG. 11.

Next, the process of the embodiment is described according to table 100 and FIG. 11. Referring to FIG. 9, the secondary information generator 724 in step 21 reads out one record in order from table 100 and makes this cluster a source cluster for link counting. The scope of the record to be read out can be restricted by any condition the user adds. In FIG. 11, we first make cluster 110 a source cluster.

In step 22, we will count the number of links, SL, going outside of cluster 110 to obtain SL=12 from FIG. 11.

Next, make cluster 111 a destination cluster in step 23. In step 24, we count the number of links, (L), existing between enodes in cluster 110 and nodes in cluster 111. Referring to FIG. 11, L=3 will be obtained.

Accordingly, in step 25, link intensity W between cluster 110 and cluster 111 is: W=3/12=0.25. We then write class004 (0.25) as a value for the related category column of record 101 in table 100.

At this point, return to step 23 to set up a destination cluster different from the source cluster 110. Repeat the process from step 23 to step 25.

When no destination cluster is found to be processed, return to step 21 to set up a different cluster and to repeat the process from step 21 to step 25.

When the above-mentioned process is performed for all the source clusters, the process ends in step 26.

Though the preferred embodiment of the invention is stated, the invention is not necessarily limited to the said embodiment.

This invention promotes efficiency in the navigation process because it ensures the centralized management of information related to the content of the content files and secondary information based on node link relations in directory server in a network, thereby allowing users to obtain the information related to the target node by accessing the directory server.

Secondary information generating means provided in the directory server to generate secondary information based on directory information, reduces the burden of modifying the secondary information generated whenever directory information is updated.

What is claimed is:

1. A directory data management method, in a secondary information generating means in a hypermedia system, of generating directory secondary information based upon directory information which indicate the characteristics of node data and link data stored in each server, comprising:

a first step of extracting a domain name, host name, and a directory name using node data including a combination of domain name, host name, and a directory name as an address in a network;

a second step of confirming whether a corresponding cluster exists with respect to each of the domain name, host name, and directory name, and generating a cluster if a corresponding cluster does not exist with respect to any of those names; and a third step of registering a node by selecting a proper cluster from a cluster generated in said second step.

2. The directory data management method according to claim 1, further comprising:

a fourth step of determining the existence of a link between nodes;

a fifth step of counting the number of links existing between clusters; and a sixth step of calculating the strength of the relation between clusters according to the calculation result in said fourth and fifth steps.

* * * * *